United States Patent
Kirkpatrick et al.

(10) Patent No.: US 7,875,674 B2
(45) Date of Patent: Jan. 25, 2011

(54) BUILDING MATERIALS INCORPORATED WITH HYDROPHOBIC SILICONE RESIN(S)

(75) Inventors: Richard L. Kirkpatrick, Adrian, MI (US); Hartmut Ackermann, Burghausen (DE); Maria Augusta Dinelli Azevedo, Pittsfield Township, MI (US)

(73) Assignee: Wacker Chemical Corporation, Adrian, MI (US)

( * ) Notice: Subject to any disclaimer, the term of this patent is extended or adjusted under 35 U.S.C. 154(b) by 35 days.

(21) Appl. No.: 12/355,852

(22) Filed: Jan. 19, 2009

(65) Prior Publication Data

US 2009/0274915 A1 Nov. 5, 2009

Related U.S. Application Data

(60) Provisional application No. 61/049,638, filed on May 1, 2008.

(51) Int. Cl.
*C08L 83/00* (2006.01)
(52) U.S. Cl. .................................. 524/588; 524/650
(58) Field of Classification Search .................. 524/588
See application file for complete search history.

(56) References Cited

U.S. PATENT DOCUMENTS

| | | | |
|---|---|---|---|
| 4,045,602 A | 8/1977 | Sommer et al. | |
| 4,076,868 A | 2/1978 | Roth et al. | |
| 4,600,657 A | 7/1986 | Wegehaupt et al. | |
| 4,704,416 A | 11/1987 | Eck et al. | |
| 5,063,087 A | 11/1991 | Eck et al. | |
| 5,578,668 A | 11/1996 | Colombet et al. | |
| 5,661,196 A | 8/1997 | Mayer et al. | |
| 5,814,411 A | 9/1998 | Merrifield et al. | |
| 5,962,585 A | 10/1999 | Mayer et al. | |
| 5,985,994 A | 11/1999 | Oberneder et al. | |
| 6,169,148 B1 | 1/2001 | Deckers et al. | |
| 6,294,608 B1 | 9/2001 | Hager et al. | |
| 6,492,459 B1 | 12/2002 | Hager et al. | |
| 6,512,059 B1 | 1/2003 | Mueller | |
| 6,676,745 B2 | 1/2004 | Merkley et al. | |
| 6,846,852 B2 * | 1/2005 | Allen et al. | .................. 522/99 |
| 2004/0219373 A1 * | 11/2004 | Deruelle et al. | ............. 428/447 |
| 2006/0025519 A1 * | 2/2006 | Desne et al. | ................. 524/588 |

FOREIGN PATENT DOCUMENTS

| | | |
|---|---|---|
| EP | 0279373 A2 | 8/1988 |
| EP | 0493168 A1 | 7/1992 |
| EP | 0908498 A2 | 4/1999 |
| EP | 1055648 A1 | 11/2000 |
| FR | 2870851 | 5/2004 |
| GB | 2043047 A | 10/1980 |
| JP | 56120561 A | 9/1981 |
| WO | 0211960 A1 | 2/2002 |
| WO | 2005044898 A1 | 5/2005 |
| WO | 2007012716 A1 | 2/2007 |
| WO | 2008062018 A1 | 5/2008 |

OTHER PUBLICATIONS

Torsten Dietz et al., Calcium Silicate Hydrate In Fiber Cement Sheets and Autoclaved Aerated Concrete (AAC); 7th International Inorganic-Bonded Wood & fiber Composite Materials Conference, Sep. 25-27, 2000, 13 pages.

* cited by examiner

*Primary Examiner*—Randy Gulakowski
*Assistant Examiner*—Lindsay Nelson
(74) *Attorney, Agent, or Firm*—Brooks Kushman P.C.

(57) ABSTRACT

An inorganic matrix building material with enhanced water impermeability is prepared by curing an inorganic curable matrix and at least one particulate hydrophobic silicone resin substantially uniformly incorporated within the matrix, the at least one hydrophobic silicone resin being selected from the group consisting of a TD resin, an MQ resin, an MT resin, an MQT resin, and combinations thereof. In certain particular instances, the at least one hydrophobic silicone resin is a TD resin. The curing takes place at elevated temperature, optionally at elevated pressure.

22 Claims, No Drawings

BUILDING MATERIALS INCORPORATED WITH HYDROPHOBIC SILICONE RESIN(S)

CROSS-REFERENCE TO RELATED APPLICATIONS

This application claims the benefit of U.S. provisional application Ser. No. 61/049,638, filed on May 1, 2008.

BACKGROUND OF THE INVENTION

1. Field of the Invention

The present invention relates to autoclaved inorganic building materials with solid particulate hydrophobic silicone resin(s) uniformly incorporated therein, and to processes of making the same.

2. Background Art

Conventional inorganic matrix building materials, including artificial stones, concrete blocks, and fiber-reinforced concrete boards, can be subject to efflorescence and freeze thaw damage which are commonly known to be associated with water absorption into and through the building materials. For example, moisture penetration into even natural permeable stone substrates can cause these materials to expand, to crack, and to cause ultimate deterioration of the structure of the building materials. Water moisture also greatly induces microbial invasion and attack, often resulting in unsightly discoloration. Masonry materials based on inorganic binders may suffer the same type of degradation due to freeze/thaw conditions, resulting in what is known as spalling and cracking.

A material's susceptibility to water absorption is thus often manifested in lower resistance to water damage, higher water permeability, higher water migration, and/or lower freeze thaw resistance. It has been the emphasis of the technical field to prevent or reduce water absorption into the building materials.

It is known in the art to apply hydrophobing agents to a surface of the building material to confer hydrophobicity, wherein the hydrophobing agents are often delivered as a solution, emulsion, or dispersion, and applied to the surface as a coating or a sealer. The solvent or liquid phase may be water or an organic liquid or mixture thereof. From an environmental standpoint, water is preferred as the solvent or continuous phase to avoid VOC emissions.

In masonry work, for example of stone, concrete block, brick, etc., water travels not only horizontally from the face of the structure, but also vertically from adjoining mortar and stone, brick, etc. Thus, hydrophobicizing the surface following construction only limits ingress of water from the outside surface. Water traveling vertically may still enter the masonry product and cause efflorescence and freeze/thaw damage. However, if all sides of the construction material are hydrophobicized prior to construction, the hydrophobic coating may prevent adherence of mortar, or subsequent application of plasters, renders, stucco, etc.

U.S. Pat. No. 4,076,868 to Roth et al. discloses a process for cleaning and rendering building materials hydrophobic. The process includes applying to the surface of the building material a solution of a hydrophobing agent having admixed therewith a filler and after evaporation of the solvent, removing the filler residue.

U.S. Pat. No. 5,063,087 to Eck et al. discloses a process for improving the adhesion of polymeric substances containing organic groups to surfaces having alkaline earth metal carbonates in which a solution of phosphorus-containing organosilicon compound is applied to a surface containing an alkaline metal carbonate, the solvent is removed and then a polymeric substance containing organic groups is applied to the treated surface.

U.S. Pat. No. 4,600,657 to Wegehaupt et al. discloses a method for coating asphaltic concrete. The method includes applying a crosslinkable composition containing a diorganopolysiloxane and rod-shaped styrene-n-butyl acrylate copolymers which are obtained from the free-radical copolymerization of monomers in the presence of the diorganopolysiloxane, and thereafter crosslinking the diorganopolysiloxane composition to form an elastomeric coating on the asphaltic concrete.

The above-described hydrophobing surface coating compositions or processes for rendering a surface hydrophobic, however, have met with limited use. For these compositions and processes, a primer is often needed as a base coating before the hydrophobing surface coating or sealer may be applied. Moreover, even before the primer or the base coating is deposited onto the surface, the surface has to be subjected to laborious pretreatment with water or acid vapor, or by sandblasting. This is particularly so when the building materials have been exposed to the atmosphere for quite some time and thus have been rendered dirty by dust or waste gases. All the above-described methods of hydrophobicizing building materials also suffer from complex methods of preparation and application, and are also generally subject to discoloration after extended exposure. The degree of hydrophobicity may also decrease over time. The pre-treatment steps along with the base coating applications thus inevitably cause the use of these hydrophobing surface coatings to be more time consuming, more labor intensive, and much less cost effective.

More recently, emulsions of organopolysiloxanes, silanes, and combinations thereof have been used to hydrophobicize external surfaces of building materials. Examples of these include U.S. Pat. No. 5,661,196 (Mayer et al.) which discloses self-dispersing organopolysiloxanes which may be coated onto building materials from aqueous emulsion; U.S. Pat. No. 5,962,585 (Mayer et al.) which discloses a stiff cream of an alkylalkoxysilane or alkoxy group-containing organopolysiloxane with a basic nitrogen-containing organopolysiloxane, the stiff cream being an aqueous cream stabilized through use of an emulsifier; U.S. Pat. No. 5,985,994 (Oberneder et al.) which discloses an aqueous dispersion of an organopolysiloxane containing condensable groups, a branched alkoxysilane, and an organosilicon compound containing basic nitrogen; U.S. Pat. No. 6,294,608 (Hager, et al.) which discloses emulsifier-stabilized aqueous emulsions of alkoxysilanes or branched organopolysiloxane containing alkoxy groups with silanes or branched organosiloxanes containing aminoalkyl groups; and U.S. Pat. No. 6,492,459 (Hager et al.), an emulsifier-stabilized aqueous cream containing alkoxysilanes or alkoxy-functional organopolysiloxanes and organic solvent. Organopolysiloxane resins are disclosed, for example, as an optional component in U.S. Pat. No. 6,492,459, the resin being dissolved in low viscosity silanes, organopolysiloxanes, or organic solvent.

The organosilicone based compositions described above have proven useful in hydrophobicizing existing masonry work such as building facades, retaining walls, tunnels, etc., but are only capable of hydrophobicizing the surface. Applications involving stiff creams are labor intensive, and the presence of organic solvents in some of the compositions described is not desirable in view of present day limitations on VOCs. These compositions reduce, but do not eliminate, freeze-thaw damage, and may be subject to discoloration after long term exposure.

SUMMARY OF THE INVENTION

It is an object of the present invention to provide inorganic matrix building materials wherein efflorescence is minimized, resistance to freeze/thaw cycles is enhanced, and the hydrophobing compositions and processes are simple and economical. These and other objects are surprisingly achieved through the use of building materials based on an inorganic matrix, into the raw material mix of which is incorporated at least one solid hydrophobic particulate silicone resin, and the mixture thereof is subsequently autoclaved to produce a building material product which is uniformly hydrophobic, yet which is capable of construction with standard mortars and the like.

DETAILED DESCRIPTION OF THE PREFERRED EMBODIMENTS

The present invention is thus directed to autoclaved inorganic matrix building materials prepared from a raw material mix containing at least one solid hydrophobic silicone resin. The building material products and their process for manufacture may be described with regard to several embodiments as discussed below, but not limited thereby.

One aspect of the present invention relates to inorganic matrix building materials with enhanced water impermeability, wherein the inorganic matrix building materials contain an inorganic curable matrix, and at least one hydrophobic silicone resin as more fully described hereinafter, substantially uniformly incorporated within the inorganic curable matrix such that enhanced water impermeability is realized throughout the inorganic curable matrix.

The building products of the subject invention are termed hereinafter, "inorganic matrix building material." The inorganic matrix building material includes an inorganic curable matrix as defined hereafter, and at least one particulate hydrophobic silicone resin substantially uniformly incorporated within the inorganic curable matrix. Depending upon the end use and appearance desired, the inorganic curable matrix may constitute fine natural stone material, i.e., sand, crushed limestone, crushed marble, a variety of silicates, etc., and one or more hydraulically settable cementitious adhesives such as Portland cement, white cement, aluminosilicate cement, trass cement, pozzolanic cement, water glass, etc. In products containing hydraulic cements of any type, the amount of water may be varied depending upon the amount of cement and the desired method of fabrication. Thus, the products may include cementitious compositions which are no more than moist prior to autoclaving, or fluid or semi-fluid compositions similar to conventional concrete, which may be readily cast. In low water formulations, regardless of whether a hydraulic cement is present or not, a so-called "green body" is generally formed by compaction. The green body is not a cured product, but retains sufficient strength to be handled without damage. In architectural stone, for example, the green body is frequently a thick block which, after autoclave curing, is cleaved to produce small blocks or "bricks" having a stone-like surface. In some instances, the inorganic curable matrix contains ingredients for forming fiber-reinforced cement boards, fiber-reinforced cement sheets, or autoclaved aerated concrete. In all cases, the products are autoclaved at elevated temperature and pressure.

The inorganic matrix building materials of the present invention rely essentially on inorganic consolidation. One example is the preparation of a curable mixture from lime and silica sand, optionally containing other ingredients or fillers such as pebbles, aggregate, or the like, which is generally compacted in a moist state into the desired shape, which is then later cured at elevated pressure, generally with pressurized steam. Such products are commonly called "artificial stone" or "artificial stone products". During initial preparation of the shaped body illustratively having the shape of a block, a cube, or a ball, and particularly during autoclaving, the mineral particles grow and fuse together, much like natural stone. In other processes, a cementitious adhesive is added, which ultimately cures to a solid shape of high strength. The subject invention is distinguished from mineral building products which are bound substantially through the use of polymers, for example the addition of curable polyesters, curable polyurethane systems, and the like. In such products, very little if any inorganic binding takes place, and the products generally cannot withstand autoclaving, a feature of all the products and processes to which the subject invention is addressed.

It is preferred that the hydrophobic silicone resin is uniformly dispersed throughout the matrix, preferably such that there is no more than a 20 percent difference and preferably no more than a 10 percent in amount between any two equivalent volume regions within the artificial stone product. The uniformity can be tested by visual inspection, such that regions of substantially different appearance are not detected, and also by applying drops of water to various positions on a cut surface, and measuring the degree of water absorption. In general, the minimum size of areas tested will be approximately 1 cm×1 cm when areal uniformity is measured, and 1 cm×1 cm×1 cm when volume uniformity is measured.

In common to all these products and their process of manufacture is that at least one particulate hydrophobic silicone resin is added to the raw material mix and uniformly distributed prior to autoclaving, and prior to green body preparation when this method production is utilized. The hydrophobic silicone resin is thus distributed in a uniform manner throughout the product. In common to all these products and processes is also a high temperature cure, generally under moist conditions, e.g. with steam under pressure.

The present invention thus relates to inorganic building materials with enhanced hydrophobicity or water impermeability and a process of making the same, wherein the inorganic building material contains an inorganic curable matrix and at least one particulate hydrophobic silicone resin substantially uniformly incorporated within the inorganic curable matrix such that enhanced hydrophobicity is realized throughout the inorganic curable matrix.

It has been surprisingly found that the subject hydrophobicizing process, by incorporating hydrophobic silicone resins in solid particulate form into the inorganic curable matrix, significantly reduces manufacturing costs, eliminates need for various post-treatment steps, and reduces volatile organic chemical emissions. The hydrophobic silicone resins are provided to the inorganic curable matrix in solid form and as such, the silicone resins may be less sensitive and more stable in relation to alkaline medium and or alkaline temperature. It has also been surprisingly discovered that very complete hydrophobing can be accomplished with the use of only minor amounts of the hydrophobic silicone resin.

As is well known in the art, the term "resin" in silicone chemistry has a different context from the same term used in other polymer arts. In direct contrast to conventional Si—O—Si containing materials such as organopolysiloxane and particularly polydimethylsiloxane wherein the majority of siloxane units are di-functional materials, silicone resins used herein according to one or more embodiments of the present invention are generally solid, highly branched and crosslinked polymers substantially insoluble in water but generally soluble in solvents such as toluene. In the present invention, the hydrophobic silicone resins are solids, but may be used either in solid particulate form, or optionally but less preferably, as a dispersion in water, and optionally together with minor amounts of dispersion aids, which may include, for example, surfactants, inorganic dispersants such as partly water-wettable silica, or co-liquid continuous phase components, in particular minor amounts of water miscible organic solvents such as alcohols, ketones, and esters. The hydrophobic silicone resins are solids at ambient temperature and in general, insoluble in water. However, due to their resultant VOC emissions, use of such co-liquid phase components is not preferred. The term "solid" with respect to resins includes resins which may otherwise be described as "semisolid," in other words extremely highly viscous liquids or gums.

The hydrophobic silicone resins of the present invention have the general formula of $M_nD_oT_pQ_q$, where M, D, T, and Q have their art recognized meanings, and reflect the starting silanes which are used to prepare the hydrophobic silicone resins. These silane starting materials, depending upon the particular method of resin preparation, are generally chlorosilanes or alkoxysilanes. Examples of M, D, T, and Q silanes are, respectively, $R_3SiX$ (M), $R_2SiX_2$ (D), $RSiX_3$ (T), and $SiX_4$ (Q), where X is a hydrolyzable group, generally a chloro, methoxy, or ethoxy group, and R is a hydrocarbon group, preferably a $C_{1-20}$ hydrocarbon group, which may, for example, be alkyl, alkenyl, cycloalkyl, cycloalkenyl, aryl, alkaryl, arylalkyl, etc. The hydrocarbon groups may be substituted, for example, by chloro or cyano groups, and in the case of R groups containing more than two carbon atoms, may contain non-adjacent O or N atoms interposed within the hydrocarbon chain, examples of which are the 2-methoxyethyl and 2-ethoxyethyl radicals.

The values of n, o, p, and q may be considered as relative numbers which reflect the relative amounts of M, D, T, and Q units in the hydrophobic silicone resins. In general, it is undesirable to have a very large proportion of D units or difunctional units, as these units in general decrease the melting point of the resin and lower the resin melt viscosity, however the presence of D units is preferred, as are also T units. For dimethyl D units, the amount is preferably less than 5%, and in the case of phenylmethyl D units, no more than 29% by weight. In any case, the D units should not be present in an amount which causes the resulting hydrophobic silicone resin (s) to be fluid. Thus, suitable resins may be designated as MT resins, MQ resins, TD resins, MQT resins, or combinations thereof. In certain particular instances, the at least one hydrophobic silicone resin is a TD resin, although the TD resin may contain residual M units and Q units as well.

In a preferred embodiment, the hydrophobic silicone resin is a TD resin. The D units of the TD resin network are preferably present in an amount of no more than 30 percent by weight, preferably no more than 15 percent by weight, yet more preferably no more than 10 percent by weight, and most preferably about 0.5 to 4 percent by weight of the total weight of the hydrophobic silicone resin(s). Pure T resins of a general formula of $(RSiX_{1.5})_n$ and particularly of the formula of $(RSiO_{1.5})_n$ tend to be crystalline, have a relatively high glass transition point and are therefore brittle solids. As such, pure T resins tend not to incorporate uniformly into a matrix and thus are not useful in the present invention, unless used in conjunction with TD resins.

Preferred R groups are those which are relatively stable under the generally alkaline processing conditions and at the autoclaving temperature. For these reasons, alkyl groups, preferably $C_{1-8}$ alkyl groups, and phenyl groups are preferred. Methyl groups are particularly preferred. Resins with exclusively methyl or phenyl R groups are generally termed methyl resins and phenyl resins, respectively, while resins which contain both methyl and phenyl R groups may be termed methylphenyl resins. Higher alkyl groups such as $C_{1-20}$ alkyl groups, cycloalkyl groups, alkenyl groups, and the like are also possible.

The resins of the subject invention although not shown in the formulae given previously, may contain residual chloro groups and or alkoxy groups depending upon the method of preparation, generally in very small amounts, and generally contain silicon-bound hydroxy groups ("silanol groups"). In at least one particularly preferred embodiment, the resins do contain silanol groups. The preferred amounts, based on weight percent of dissolved silicon-bound hydroxy groups of the total weight of the hydrophobic silicone resins, is from 0.001 to 20.0 percent, preferably from 0.01 to 16.0 percent, preferably from 0.05 to 12.0 percent, and more preferably from 0.1 to 5.0 percent. The weight percentage of the silanol groups is calculated with O1/2H groups. By way of example, 0.55 weight percent of O1/2H is approximately equivalent to 1.04 weight percent of OH or 2.75 weight percent of Si—OH. These measurements may be carried out using an NMR (nuclear magnetic resonance).

In at least another particularly preferred embodiment, the resins do contain alkoxy groups. The preferred amounts, based on weight percent of the alkoxy groups of the total weight of the hydrophobic silicone resins, is from 0.1 to 20.0 percent, preferably from 0.5 to 16.0 percent, and more preferably from 1.0 to 12.0 percent. In general, preferred resins contain both silanol groups and silicon-bonded alkoxy groups, and may also contain a minor amount of silicon-bonded chlorine as well. For these embodiments, alkoxy content is calculated with O1/2R with R representing an organic group. By way of example, 3.2 weight percent of O1/2Et is approximately equivalent to 3.89 weight percent of OEt or 6.31 weight percent of Si—OEt. These measurements may also be carried out using an NMR.

Hydrophobic silicone resins according to one or more embodiments of the present invention are substantially insoluble in water and in general soluble in organic solvents such as aromatics, esters, ketones, and paraffinic hydrocarbons. As used herein and unless otherwise noted, the term "substantially insoluble in water" refers to the extent of hydrophobicity of the hydrophobic silicone resins, wherein the maximum weight percent of the hydrophobic silicone resins per total weight of the resulting water mixture at equilibrium in order of increasing preference, is no greater than 10 weight percent, 8 weight percent, 6 weight percent, 4 weight percent, 2 weight percent, or 0.5 weight percent. In certain instances, the maximum weight percent is no greater than 2 weight percent and in certain other instance no greater than 0.5 weight percent.

Hydrophobic silicone resins according to one or more embodiments of the present invention are generally used in the form of small particles, preferably fine powders. In at least one embodiment, the hydrophobic silicone resins are present in a particulate form with at least 50 percent of the particles having an average particle size no greater than 100 micrometers (μm) and preferably at least about 90 percent of the particles having an average particle size no greater than 100 micrometers (μm). The hydrophobic silicone resins are directly dispersed into and incorporated with the inorganic curable matrix, which in certain instances, is an admixture of various inorganic ingredients via an alkaline admixing process. As readily uniformly incorporated, the hydrophobic silicone resins are in direct contact with and surrounded by the inorganic curable matrix and as such, the maximum hydrophobic effect may be realized.

The hydrophobic silicone resins according to one or more embodiments of the present invention are preferably not in direct contact with emulsifiers or surfactants which are often necessary for preparing emulsions applied to carriers for forming conventional silicone granules. These conventionally used surfactants, which are preferably avoided to be in direct contact with the hydrophobic silicone resins according to one or more embodiments of the present invention, include anionic surfactants such as alkali metal and ammonium salts of fatty acids having 12 to 18 carbon atoms, alkaryl sulphonates or sulphates and long chain alkyl sulphonates or sulphates; and cationic surfactants such as quaternary ammonium salts containing long chain alkyl group having 8 to 20 carbon atoms.

According to one or more embodiments of the present invention, the at least one hydrophobic silicone resin is dispersed into the inorganic curable matrix in a fine powder form or a discrete particulate form. These forms are drastically different from the conventional granulate form resulting from agglomeration of a plurality of silicone resin particles that are often combined with particle binders. By dispersing the at least one hydrophobic silicone resin in a fine powder or particulate form directly into the inorganic curable matrix, the inorganic building materials of the present invention are distinguished from those employing granulates by effectuating a substantially uniform distribution of the hydrophobic silicone resins across the inorganic curable matrix.

In addition to decreasing uniformity in hydrophobiciation of the inorganic building materials, granulation is itself a costly process and often invites unnecessary material loss between intermediate steps. Roughly 2 to 5 weight percent of the silicone resins in raw material granulation process may be wasted before the silicone resins even make their way into a final masonry product. These monetary losses translate to amount to several hundred dollars for a four-thousand-pound batch of a masonry product. Thus, avoiding granulation of the silicone resins and using the silicone resins directly in powder or particulate form affords drastic cost-cutting benefits while delivering enhanced hydrophobing results.

Contrary to conventional silicone resin product or building materials, the hydrophobic silicone resin, according to one or more embodiments of the present invention, is not pre-treated with binders. Conventional silicone resins often contain one or more binders to adhere a plurality of silicone resin particles to form an agglomerated granule form of the silicone resin. Conventional binders include water-soluble or water-dispersible binder materials and water-insoluble or water-indispersible binder materials. Examples of those conventional binders include polyvinyl alcohols, methyl cellulose, carboxy methyl cellulose, polycarboxylates, polyvinyl acetate, vinyl acetate ethylene copolymers and acrylate ester polymers. Pretreatment of the at least one silicone resin with binders is not used according to one or more embodiments of the present invention, at least partly because the adhesive nature and the film-forming capability of many binders tend to render ineffective a uniform distribution of the silicone resins and hence a final masonry product defective in hydrophobicity. In addition, excessive use of binders on top of any amount of adhesives otherwise present in a building material may also interfere with the hydration processes of the building material when water is added to the building material prior to its application or use.

It is to be noted that silicone resins used herein are not T resins. It is in fact a discovery that the hydrophobic silicone resins of the present invention deliver satisfactory hydrophobing effects on a resultant building material while only a relatively minute amount of the silicone resin is used. By way of comparison, conventional silsesquioxanes, or T resins, have to be used in a much larger amount, such as 5 to 10 weight percent, in order to have a noticeable hydrophobing effect. Silicone resins are relatively expensive, and thus the conventional massive use of silsesquioxanes has thus been met with limited use. The present discovery of the use of the at least one hydrophobic silicone resin in a form and a weight percent, as described according to one or more embodiments of the present invention, is both economically practical and functionally advantageous. Furthermore, the use of an autoclaving curing process with the hydrophobic silicone resin-containing building material makes the water-impermeability of the final product synergistically realized with lower material cost and ease of handling.

Hydrophobic silicone resins may be prepared by methods known in organosilicon chemistry, for example as disclosed in CHEMISTRY AND TECHNOLOGY OF SILICONES, Academic Press, by Walter Noll ©1968. Preferred resins are the TD resins containing silanol groups and or alkoxy groups, preferably hydrophobic silicone resins SILRES® BS 1321 and, SILRES® H44, available from Wacker Chemie AG, Munich Germany.

SILRES® BS 1321 is a solvent-free, methyl silicone resin with high reactivity and improved resistance to heat. SILRES® BS 1321 is soluble in aromatics, esters, ketones and selected paraffins and chlorinated hydrocarbons. When measured by differential scanning calorimetry (DSC), SILRES® BS 1321 has a glass transition temperature range of 35 to 55 degrees Celsius. SILRES® BS 1321 remains solid at ambient temperature.

SILRES® H44 is a powdered phenylmethyl polysiloxane resin with good heat stability and often used as a binder for the socket cement of high-temperature incandescent lamps. SILRES® H44 is readily soluble in industrial ethyl alcohol, butyl alcohol, acetone, halogenated hydrocarbons, aromatic hydrocarbons, ketones, ethers, and esters. SILRES® H44 has a glass transition temperature of no less than 30 degrees Celsius.

The hydrophobic silicone resins are preferably used in an amount between 0.001 to 10 percent by weight of the total weight of the inorganic building material, more preferably between 0.005 to 8 percent by weight of the total weight of the stone product, and in order of increasing preference, between 0.01 to 5 percent by weight, 0.02 to 4 percent by weight, and between 0.03 to 2 percent by weight. Hydrophobic silicone resins in a weight percent higher than the above recommended ranges may be used in certain applications such as fiber-reinforced cement products. Even when a higher concentration of the hydrophobic silicone resins are used, issues with excessive hydrophobicity of the resultant products should be considered. If rendered excessively hydrophobic due to use of a large amount of the hydrophobic silicone resin, the resultant products may not be as adherent as needed and subsequent construction steps may be rendered unnecessarily difficult.

The hydrophobic silicone resins may be used in conjunction with one or more auxiliary hydrophobing agents, and as a result, lower amounts of the hydrophobic silicone resins than that described above may be useful. Auxiliary hydrophobing agents should be non-migratable under autoclaving conditions and under exposure conditions. They should also not interfere with the binding of the inorganic matrix. Examples include long chain fatty acids and amides and the like.

As described previously and shown below, one or more embodiments of the subject invention relate to a stone product and a process of making the same with enhanced hydrophobicity through intermixing a hydrophobic silicone resin directly into the inorganic curable matrix without first solubilizing the hydrophobic silicone resin.

It has been surprisingly discovered that the hydrophobing solid silicone resins employed in the subject invention are not only powerful hydrophobing agents, but also produce a degree of hydrophobicity which is uniform across the autoclaved product cross-section. In contrast, other hydrophobing agents have not been shown as capable of achieving the same results. For example, similar inorganic matrix building materials have been attempted to be produced using a solid additive consisting of a conventional silane hydrophobing agent adsorbed on a carrier such as silica. Surface hydrophobicity is less than desired, and the product after autoclaving is shown to have a non-uniform distribution which is manifested in a striped appearance, the center of the product being darker than the exterior. Likewise, a solid additive containing adsorbed polydimethylsiloxane fluid, also a common hydrophobing agent, likewise has failed.

The inorganic curable matrix may contain one or more of natural stones, natural fibers such as cellulose fibers, synthetic fibers such as polyvinyl acetate, clay, lime, quicklime, ash, cement, silicates such as silica sand, amorphous silica, perlite, vermiculite, mica, bentonite, kaolin, slag, PFA (pulverized fuel ash), or any combinations thereof. The inorganic curable matrix is provided by combining two or more inorganic building material ingredients listed above under a condition that facilitates mixing, optionally with the addition of water in a sufficient amount, preferably 1 to 30% by weight.

In another embodiment, the inorganic curable matrix contains silica in the form of silica sand, PFA (pulverized fuel ash), and or other forms of silica. Inclusion of silica helps reduce the alkalinity of the resultant mixture and improves dimensional stability of a formed product. Specific surface area of the silica is of particular importance. In most cases the silica sand is ground to the required fineness by ball milling. The silica sand illustratively has a surface area in the range of 2000 to 4000 $cm^2/g$. Ball milling helps to generate finer sand, and finer sand reduces processing time, increases degree of crystallization, increases compressive strength, and decreases shrinkage.

In at least yet another embodiment, the inorganic curable matrix contains cement and or lime/quicklime or other hydraulically settable inorganic binder which provide the required CaO (calcium oxide) for the hydrothermal curing reactions. Moreover, in the case of forming autoclaved aerated concrete (AAC), the quicklime generates heat needed for gas formation.

One can also disperse air into the inorganic curable matrix or generate pores with a blowing agent. In addition to porous cement, lightweight cement may contain polymer beads, either solid or hollow, in particular polymer beads which have little attraction to the cementitious matrix and thus act as crack propagation centers. Such crack propagation increases the ductility of the product by controlled generation of many but small microcracks.

In at least one particular embodiment, the inorganic curable matrix is a fiber-reinforced cement product or the like. Processes for forming fiber-reinforced cement products are known and illustratively shown in U.S. Pat. No. 6,676,745 to Merkely et al., the entire content of which is incorporated herein by reference. The '745 patent discloses mixing sized cellulose fibers with other ingredients to form a waterborne mixture, slurry, or paste. The sized fibers are mixed with cement, silica, a density modifier and other additives. The mixture is then formed into a "green" or uncured shaped article optionally followed with a pressing or embossing operation. The "green" or uncured shaped article is then air cured or temperature cured.

In all embodiments, the mixture of the hydrophobic silicone resins and the inorganic curable matrix is subject to elevated temperature curing, preferably under pressure. Such curing, regardless of the pressure, is termed "autoclaving" herein. Saturated steam under pressure not only accelerates the hardening of cement or concrete but also forms different types of calcium silicate hydrate. In contrast, air curing where calcium silicate hydrate (C—S—H) is mostly amorphous or of poorly crystalline structure and the amorphous forms of C—S—H have a higher affinity to temporarily bind water. Autoclaved calcium silicate hydrate is mostly well crystallized. The degree of crystallization depends on the raw materials, curing conditions in the autoclave and other factors. It is generally accepted that crystallization decreases curing shrinkage and improves resistance to chemical attack.

The inorganic matrix building materials may also include other additives such as color pigments, aeration agents, surfactants, wax, fatty acids such as oleic acid, triethanol amine, or any combinations thereof. It at least one particular embodiment where oleic acid and triethanol amine are present, it is believed that at least some of the oleic acid and triethanol amine react with each other to form triethanolamine oleate salt. In cement-based products where the ability to cast (pourability) is required, conventional plasticizers and superplasticizers and other rheology adjusting materials may be added.

Suitable waxes include polyethylene waxes, polypropylene waxes, paraffin waxes, polytetrafluoroethylene waxes, silicone waxes, and mixtures thereof. In one embodiment, the aqueous composition contains an oxidized polyolefin wax, such as prepared by the process disclosed in U.S. Pat. No. 6,169,148, the entire content of which is incorporated herein by reference. The waxes may be provided as emulsions such as anionic wax emulsions, nonionic polyethylene emulsions, nonionic paraffin emulsions, and anionic paraffin/polyethylene emulsions or as powders such as polyethylene powder and modified synthetic wax powder. A preferred wax is anionic paraffin/polyethylene emulsion. Waxes are preferably not used.

It is contemplated that the oleic acid could be substituted in whole or in part with other fatty acid emulsifiers of different chain lengths; and non-ionic alkyl, ethyleneoxide based emulsifiers. It is anticipated that both or either anionic and non-ionic emulsifiers could be used. It is further contemplated that triethanol amine could be substituted in whole or in part with diethanol amine, ethanol amine, or any alkyl amine, arylamine, potassium hydroxide, sodium hydroxide, ammonium hydroxide, or alkaline material. It is anticipated that any suitable alkaline material could be used.

It is contemplated that any suitable biocide could be used. One such suitable biocide includes water soluble biocides. Biocides are well known in the art, and are often used, for example, in tile adhesives and jointing mortars for wet or humid environments such as bathroom showers.

In at least yet another embodiment, the building material mixture is diluted with water and the resultant diluted mixture is compressed to form thin layers of solid materials. In a typical compressing and sheeting process, a rotating sieve cylinder collects a thin layer of the solid materials while most of the (excessive) water passes through wire meshes of the sieve. The thin layers of all the various sieve cylinders are collected on a felt, which runs with an exemplary speed of 230 to 400 feet per minute. Sheet thickness is controlled by an automatic system, which influences the density of the diluted mixture going to the sheeting tubs and the felt speed. The sheets may remain flat or may be corrugated. The sheets may be compressed in a stack or single sheet press to improve strength and increase freeze-thaw resistance.

Another aspect of the present invention relates to a process for forming the inorganic matrix building materials with enhanced water impermeability. The process includes admixing at least one hydrophobic silicone resin and an inorganic curable matrix to form a building material mixture; and curing the mixture under heat and optionally at elevated pressure such that the hydrophobic silicone resins are substantially uniformly incorporated with the inorganic curable matrix. In at least one embodiment, the process further includes, before the step of admixing, providing an inorganic curable matrix by combining two or more of the building material ingredients. The mixing is preferably implemented within a time period between 1.5 to 12 hours. After mixing, the inorganic curable matrix is sufficiently cooled such that the hydrophobic silicone resin(s) remain stable when admixed into the inorganic curable matrix. The mixing is optionally facilitated with an accumulative addition of water, whereas the total amount of water is between 2 to 30 percent by weight of the total weight of the inorganic curable matrix. The water is added to hydrate lime or quicklime included within the material matrix. The admixing step further includes admixing an additive to the mixture, wherein the additive illustratively includes color pigments, aeration agents, ancillary hydrophobing agents, or any combinations thereof.

In one embodiment, the hydrophobic silicone resins are added after a time period during which two or more reactive building material ingredients are combined to form the inorganic curable matrix. Substantial amount of heat may be generated through the formation of the inorganic curable matrix, for example when silica sand and lime are combined with water, and the silicone resins are preferably added later to avoid alkalinity attack at the temperature established by the exothermic reaction. The time period during which the material matrix is formed and after which the hydrophobic silicone resins or the additives are added may vary widely, for example between 0.1 to 30 minutes, preferably between 0.5 to 20 minutes, and more preferably between 1 to 15 minutes. Other additives may be added after the inorganic curable matrix is formed and optionally be added along with the addition of the hydrophobic silicone resins.

An illustrative autoclaving method may be shown in Dietz et al. ("Calcium Silicate Hydrate in Fiber Cement Sheets and Autoclaved Aerated Concrete (AAC); $7^{th}$ International Inorganic-Bonded Wood & Fiber Composite Materials Conference; Sep. 25-27, 2000; Sun Valley, Id., USA) provides a general overview of the process, the entire content of which is incorporated herein by reference.

Curing preferably occurs at a temperature between 150 and 250 degrees Celsius, more preferably between 190 to 210 degrees Celsius. In preferred embodiments, curing occurs under a pressure between 100 and 250 psi, more preferably between 150 to 200 psi, and most preferably between 170 to 180 psi. The curing is preferably conducted in the presence of steam.

In general, prior to cure, the mixture is compressed into a pre-determined form and or shape under force. In cement-free and low cement formulations, this shape is commonly without significant strength prior to cure, and is termed a "green body." Upon curing, particularly under heat, pressure, and the presence of moisture, as described previously, a building material of great strength is obtained.

While the invention has been described with respect to autoclaved building products, it is also generally applicable to mineral building products which are cured at room temperature and pressure. This is particularly true for products which exhibit an exotherm during cure, for example compositions which contain significant quantities of hydraulic cements, lime, etc., which especially in large volume shapes may reach temperatures close to or above the softening point of the resin. The use of the hydrophobic silicone resins is generally applicable to mineral-based building products.

Having generally described this invention, a further understanding can be obtained by reference to certain specific examples which are provided herein for purposes of illustration only and are not intended to be limiting unless otherwise specified.

EXAMPLE 1

Artificial Stone

A preblend of lime, sand and water is prepared, during which considerable heat is released, the product containing varying amounts of calcium silicate, and possibly unreacted sand and/or hydrated lime. SILRES® BS 1321 is added to the preblend of lime & sand, together with color pigments and a sufficient amount of water to ensure that the material can be compacted in a mold to prepare a handleable green body block. Prior to compaction, the ingredients are blended in a mixer for approximately 4 to 6 minutes. Once the blocks are made, the blocks undergo autoclaving for almost 9 hours, at temperature of 163 to 177 degrees Celsius and 125 psi of pressure. An optimum addition of the hydrophobic silicone resin varies from 0.05 to 1.5 percent by weight. Optimal properties have been achieved with 3.6 lbs of the silicone resin for 4000 lbs of calcium silicate.

EXAMPLE 2

Fiber Cement Board

The desired amount of SILRES® BS 1321 is added by weight to a fiber cement slurry, for example one of cellulose fiber, flyash, calcium carbonate, and cement, at consistency of 20 to 23 weight percent of solids in water and mixed for approximately 15 minutes. The cement slurry is diluted with water to 7 weight percent of solids. To the diluted slurry is added an anionic polymer flocculation aid and defoamer to generate fiber cement solids. The fiber cement is formed, pressed, and dried into a shaped body such as the form of sheets for approximately 8 to 9 hours at 100 percent humidity at a temperature of 62 degrees Celsius. Once dried, the fiber cement sheets undergo autoclaving for a total of 9 hours, at a pressure between 100 to 150 psi and at a temperature of 148 to 177 degrees Celsius. The resin usage may vary from 0.01 to 2 percent by weight depending upon the physical and water performance level required by the fiber cement manufacture.

EXAMPLE 3

Forming Stone Products Impregnated with Silicone Resins

To form an inorganic curable matrix, sand is laid on a conveyor, to which water is added. Silica and lime are added with additional water. The material matrix is put into an 80 ton reactor to allow the lime to hydrate for a period of 10 hours. The instant matrix forming process may be rendered alkaline in nature and a substantial amount of heat may also be concurrently generated. It is after this alkaline premixing step that hydrophobic silicone resins are added as detailed below.

Then, in 4000 lb batches, the silica and lime mixture is run through a grinder and dropped into a mixing vessel. The hydrophobic silicone resins SILRES® BS 1321 in various amounts are added to each batch. The mixture is mixed throughly for 3 minutes. A 1000 ton press is used to form blocks which are then subject to autoclave-assisted curing. The curing is carried out at a temperature of 350 F with steam at a pressure of 160 psi. The curing takes about 9 hours. Block specimens containing various loadings of the hydrophobic silicone resins of 2"×2.75"×2.75" in size are subjected to freeze/thaw procedures indicated below:

1) The test specimens are dried in a forced draft oven for a few days at a reasonable temperature to remove any moisture. In this case, the specimens sit in the 50 degree Celsius oven over a weekend.

2) The specimens are removed from the oven, allowed to come to room temperature, and placed in a tray with ½ inch of water. This ½ inch level was maintained at room temperature for 4.5 hours, and the tray is then placed in a freezing chamber for about 20 hours at 0 to −20 degrees Celsius.

3) The tray is removed and set in a thawing tank of room temperature water for 4.5 hours. The water level in the tray is maintained at ½ inch between freeze/thaw cycles. The tray is removed from the thawing tank and returned to the freezer for 20.5 hours, thus starting another freeze thaw cycle. The tray is not completely immersed in the thawing tank, just enough to warm the sides of the tray.

4) After the last freeze/thaw cycle for the normal work week, the specimens are removed from the trays of water and stored for 68 hours at room temperature on wire racks to facilitate even drying. After air drying, the specimens are brushed with a stiff brush to remove any loose material.

5) Four freeze/thaw events constitute one "cycle." After the completion of a cycle, test two specimen blocks per group are tested for compressive strength, and this process is continued for 3 cycles. The recorded data is collected in Table I. The loadings are 3.6 lbs of silicone resin per 4000 lbs of total stone product, 10 lbs of silicone resin per 4000 lbs of total stone product, and 20 lbs of silicone resin per 4000 lbs of total stone product.

TABLE I

Compressive strength evaluation among specimens of varied loadings of hydrophobic silicone resins.

| SILRES ® BS 1321 Loading | Initial lb/ft$^2$ | 1 Freeze/ Thaw Cycle | 2 Freeze/ Thaw Cycle | 3 Freeze/ Thaw Cycle | Average lb/ft$^2$ | Standard Deviation |
|---|---|---|---|---|---|---|
| 3.6 lbs | 28300 | 24300 | 26000 | 33400 | 27900 | 3956 |
| 10.0 lbs | 23800 | 23000 | 23400 | 21000 | 22467 | 1243 |
| 20.0 lbs | 24700 | 18790 | 22000 | 18080 | 18950 | 3762 |

The blocks thus prepared are found to have uniform color throughout, indicating uniform distribution of the hydrophobic silicone resin. However, the blocks still contain sufficient surface permeability such that the blocks are adherent to conventional mortar, and thus can be used in construction without use of non-conventional techniques. By comparison, use of silanes or silicone fluids uniformly distributed throughout the matrix by mixing these hydrophobing agents adsorbed on silica into the raw material mix produce blocks with significant and observable color change from the exterior to the interior of the block, and which show significant differences in hydrophobicity and water permeability between the interior and exterior.

EXAMPLE 4

A fiber reinforced concrete mixture is formed from sand, aggregate, Portland cement, and about 2 weight percent cellulose fibers. Dry blended into the mixture is 0.1 weight percent of a silicone resin in particulate form. Sufficient water is added to form a fluid mixture which is cast into sheets of approximately 0.8 cm thickness, and allowed to set. The sheets are then autoclaved for 5 hours to produce uniformly hydrophobic inorganic matrix sheets.

EXAMPLE 5

The process of Example 4 is followed, except that the silicone resin is not dry blended into the dry ingredients, but is added as a dispersion of solid resin particles in all or a portion of the water required to form the fluid mixture.

EXAMPLE 6

A lightweight cement product is prepared from a conventional raw material mix incorporating fly ash to render the cured product porous and lightweight. Into the dry ingredients is blended 0.2 weight percent of a solid, particular silicon resin, and water is added and mixed thoroughly to produce a liquid, castable product. The curable mixture is poured into shaped block molds, allowed to set, and then autoclaved for 6 hours. Uniformly hydrophobic lightweight cement blocks are obtained.

EXAMPLE 7

The process of the previous example is followed, but the amount of fly ash is diminished or eliminated. Air is intensively mixed into the fluid curable mixture which is then cast into blocks. The blocks are then autoclaved for 5 hours to produce uniformly hydrophobic blocks containing numerous air-filled pores.

Except in the examples, or where otherwise expressly indicated, all numerical quantities in this description indicating amounts of material or conditions of reaction and/or use are to be understood as such and also as modified by the word "about" in describing the broadest scope of the invention. Practice within the numerical limits stated is generally preferred. Also, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An inorganic matrix building material with enhanced water impermeability, the inorganic matrix building material comprising:
   an inorganic curable matrix; and
   at least one hydrophobic silicone resin substantially uniformly incorporated within the inorganic curable matrix such that enhanced water impermeability is realized throughout the inorganic curable matrix;
   wherein the hydrophobic silicone resin is a TD resin; and
   wherein the building material is autoclaved at a temperature higher than the melting point of the hydrophobic silicone resin.

2. The inorganic matrix building material of claim 1 wherein the at least one hydrophobic silicone resin is free of a resin pretreatment binder selected from the group consisting of polyvinyl alcohols, methyl cellulose, carboxy methyl cellulose, polycarboxylates, polyvinyl acetate, vinyl acetate ethylene copolymers, acrylate ester polymer, and combinations thereof.

3. The inorganic matrix building material of claim 1, wherein the hydrophobic silicone resin is solid at ambient temperature.

4. The inorganic matrix building material of claim 1, wherein the hydrophobic silicone resin is no more than 10 weight percent soluble in water.

5. An inorganic matrix building material with enhanced water impermeability, the inorganic matrix building material comprising:
   an inorganic curable matrix; and
   at least one hydrophobic silicone resin substantially uniformly incorporated within the inorganic curable matrix such that enhanced water impermeability is realized throughout the inorganic curable matrix;
   wherein the hydrophobic silicone resin is a TD resin, an MQ resin, an MT resin, an MQT resin, or any combination thereof; and
   wherein the building material is autoclaved at a temperature higher than the melting point of the hydrophobic silicone resin, wherein D units contained within the TD resin are present in an amount of 0.5 to 4 weight percent of the total weight of the hydrophobic silicone resin.

6. The inorganic matrix building material of claim 1, wherein the hydrophobic silicone resin contains at least one silanol group, alkoxy group, or combinations thereof.

7. The inorganic matrix building material of claim 6, wherein the hydrophobic silicone resin contains silanol groups in an amount, based on the total weight of the hydrophobic silicone resin, of from 0.001 to 20 percent.

8. The inorganic matrix building material of claim 6, wherein the hydrophobic silicone resin contains alkoxy groups in an amount, based on the total weight of the hydrophobic silicone resin, from 0.1 to 20 percent.

9. The inorganic matrix building material of claim 1, wherein the inorganic curable matrix contains ingredients for forming fiber-reinforced cement boards, fiber-reinforced cement sheets, or autoclaved aerated concrete.

10. The inorganic matrix building material of claim 1, wherein the hydrophobic silicone resin is present in an amount of between 0.01 to 5 percent by weight of the total weight of the building material.

11. The inorganic matrix building material of claim 1, wherein the hydrophobic silicone resin is present in an amount of between 0.1 to 2 percent by weight of the total weight of the building material.

12. The inorganic matrix building material of claim 1, wherein the inorganic curable matrix includes calcium silicate.

13. The inorganic matrix building material of claim 1, wherein the hydrophobic silicone resin concentration varies by no more than 20 percent between any two equivalent regions throughout a building material cross-section such that the hydrophobic silicone resin is substantially homogeneously distributed within the inorganic curable matrix.

14. A process for producing an inorganic matrix building material with enhanced water impermeability, the process comprising:
   a) admixing at least one hydrophobic silicone resin with an inorganic curable matrix to form a curable mixture, the at least one hydrophobic silicone resin being a TD resin;
   b) transforming the curable mixture into a shaped body; and
   c) curing the curable mixture under heat and optionally at an elevated pressure to form a uniformly hydrophobic inorganic matrix building material product.

15. The process of claim 14, wherein the curing step is conducted in an autoclave such that the shaped body is autoclaved under heat at the elevated pressure to form the uniformly hydrophobic building material.

16. A process for producing an inorganic matrix building material with enhanced water impermeability, the process comprising:
   a) admixing at least one hydrophobic silicone resin with an inorganic curable matrix to form a curable mixture, the at least one hydrophobic silicone resin being selected from a group consisting of a TD resin, an MQ resin, an MT resin, an MQT resin, and combinations thereof;
   b) transforming the curable mixture into a shaped body; and
   c) curing the curable mixture under heat and optionally at an elevated pressure to form a uniformly hydrophobic inorganic matrix building material product, the process further comprising, before step (a), (d) providing the inorganic curable matrix, wherein the inorganic curable matrix is sufficiently cooled such that the hydrophobic silicone resin remains stable when admixed to the inorganic curable matrix.

17. The process of claim 14, wherein the inorganic curable matrix contains ingredients for forming fiber-reinforced cement boards, fiber-reinforced cement sheets, or autoclaved aerated concrete.

18. The process of claim 14, wherein the inorganic curable matrix includes calcium silicate.

19. The process of claim 14, wherein the curing is conducted at a temperature between 150 and 250 degrees Celsius.

20. The process of claim 14, wherein the curing is conducted at a pressure between 100 to 250 psi.

21. The process of claim 14, wherein the admixing step further includes admixing an additive selected from the group consisting of color pigments, aerating agents, ancillary hydrophobing agents other than silicone resins, and combinations thereof.

22. The process of claim 14, where the shaped body is a green body.

* * * * *